(12) United States Patent
Ivan et al.

(10) Patent No.: US 7,626,178 B2
(45) Date of Patent: Dec. 1, 2009

(54) INTEGRATED NEUTRON-GAMMA RADIATION DETECTOR WITH ADAPTIVELY SELECTED GAMMA THRESHOLD

(75) Inventors: Adrian Ivan, Niskayuna, NY (US); Steven Jude Duclos, Clifton Park, NY (US); Daniel Bruno McDevitt, Schenectady, NY (US); James Richard Williams, Lorain, OH (US); Brent Allen Clothier, Niskayuna, NY (US); Jeffrey Seymour Gordon, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 184 days.

(21) Appl. No.: 11/949,095

(22) Filed: Dec. 3, 2007

(65) Prior Publication Data

US 2009/0140150 A1 Jun. 4, 2009

(51) Int. Cl.
*G01T 3/06* (2006.01)
*G01T 1/20* (2006.01)
*G01T 3/08* (2006.01)

(52) U.S. Cl. .............. 250/390.11; 250/361 R; 250/370.05; 250/367

(58) Field of Classification Search .......... 250/390.11, 250/361 R, 370.05
See application file for complete search history.

(56) References Cited

U.S. PATENT DOCUMENTS

| 4,829,185 | A  | * | 5/1989 | Kerff ..................... 250/361 R |
| 2005/0023479 | A1 | * | 2/2005 | Grodzins ............... 250/390.11 |
| 2006/0138340 | A1 | * | 6/2006 | Ianakiev et al. ........ 250/390.01 |
| 2007/0029493 | A1 |   | 2/2007 | Kniss et al. |
| 2007/0272874 | A1 | * | 11/2007 | Grodzins ............... 250/390.11 |

* cited by examiner

*Primary Examiner*—Constantine Hannaher
*Assistant Examiner*—Mindy Vu
(74) *Attorney, Agent, or Firm*—Ann M. Agosti

(57) ABSTRACT

An integrated radiation detector having a pulse-mode operating photosensor optically coupled to a gamma sensing element and a neutron sensing element is disclosed. The detector includes pulse shape and processing electronics package that uses an analog to digital converter (ADC) and a charge to digital converter (QDC) to determine scintillation decay times and classify radiation interactions by radiation type. The pulse shape and processing electronics package determines a maximum gamma energy from the spectrum associated with gamma rays detected by the gamma sensing element to adaptively select a gamma threshold for the neutron sensing element. A light pulse attributed to the neutron sensing element is a valid neutron event when the amplitude of the light pulse is above the gamma threshold.

18 Claims, 4 Drawing Sheets

INTEGRATED NEUTRON-GAMMA RADIATION DETECTOR WITH ADAPTIVELY SELECTED GAMMA THRESHOLD

BACKGROUND OF THE INVENTION

1. Field of the Invention

The teachings herein relate to a hand held detector of ionizing radiation and more particularly to a detector for discriminating a gamma component and a neutron component.

2. Description of the Related Art

Detection of radioactive materials, particularly those illicitly hidden in the stream of commerce, requires the availability of a variety of radiation detection equipment. In particular, Hand-Held RadioIsotope Identification Devices (HHRIID) are needed in the field to quickly determine the presence of special nuclear material and distinguish it from the presence of medical and industrial radioisotopes, as well as from normally occurring radioactive material. One possible embodiment of an HHRIID consists of two optically separated radiation sensors that emit light and are coupled to a common photodetector. The first radiation sensor is a neutron sensing component that contains atomic nuclei with a high neutron cross section, such as $^6$Li in a chemical compound, such as $^6$LiF, surrounded by particles of a scintillator material, for example, ZnS:Ag, and bound together in an epoxy matrix. The second radiation sensor is a gamma sensing component and consists of a scintillator crystal with enhanced gamma energy resolution, high gamma stopping power, and an atomic composition with very low neutron absorption cross section. The two radiation sensors are optically separated in such a manner that the light emitted by one sensor does not reach the other sensor in order to avoid optical crosstalk. The HHRIID may include a pulse shape discrimination circuit that identifies the source of light emitted (either by the neutron sensing component or the gamma sensing component based on the difference in scintillation light decay times.)

One issue associated with HHRIID applications that has not been previously addressed is the radiation cross talk in the neutron sensing component. Even though by design the neutron sensing component is typically sub-millimeter thin and contains atoms with low-Z numbers, it is still sensitive to gamma rays. In many field applications, it is possible that the incident gamma flux is high enough to create a significant number of interactions in the neutron sensing component, thereby impeding the detection and measurement of low neutron fluxes that may be present at the same time.

What is needed is a compact, integrated HHRIID design that minimizes or eliminates the radiation cross talk in the neutron sensing component, thus enabling improved analyses of the various components of a mixed radiation field.

BRIEF SUMMARY OF THE INVENTION

An integrated neutron-gamma radiation detector comprises a gamma sensing element; a neutron sensing element; a photosensor optically coupled to both the gamma sensing element and the neutron sensing element; and pulse shape and processing electronics coupled to the photosensor for determining a maximum gamma energy associated with the gamma sensing element. A gamma threshold for the neutron sensing element is based on the maximum gamma energy present in the radiation field, as determined from the gamma sensing element. A light pulse from the neutron sensing element is counted as a valid neutron event when the amplitude of the light pulse is above the gamma threshold.

A method for adaptively selecting a gamma threshold in an integrated neutron-gamma radiation detector, the detector comprising a gamma sensing element, a neutron sensing element, a photosensor optically coupled to the gamma sensing element and the neutron sensing element, and a pulse shape and processing electronics package coupled to the photosensor, the method comprising the steps of:

determining a maximum gamma energy associated with gamma rays detected by the gamma sensing element;

selecting a gamma threshold for the neutron sensing element based on the maximum gamma energy, whereby a light pulse is counted as a valid neutron event when an amplitude of the light pulse emitted by the neutron sensing element is above the gamma threshold.

DETAILED DESCRIPTION OF THE INVENTION

Figure 1:
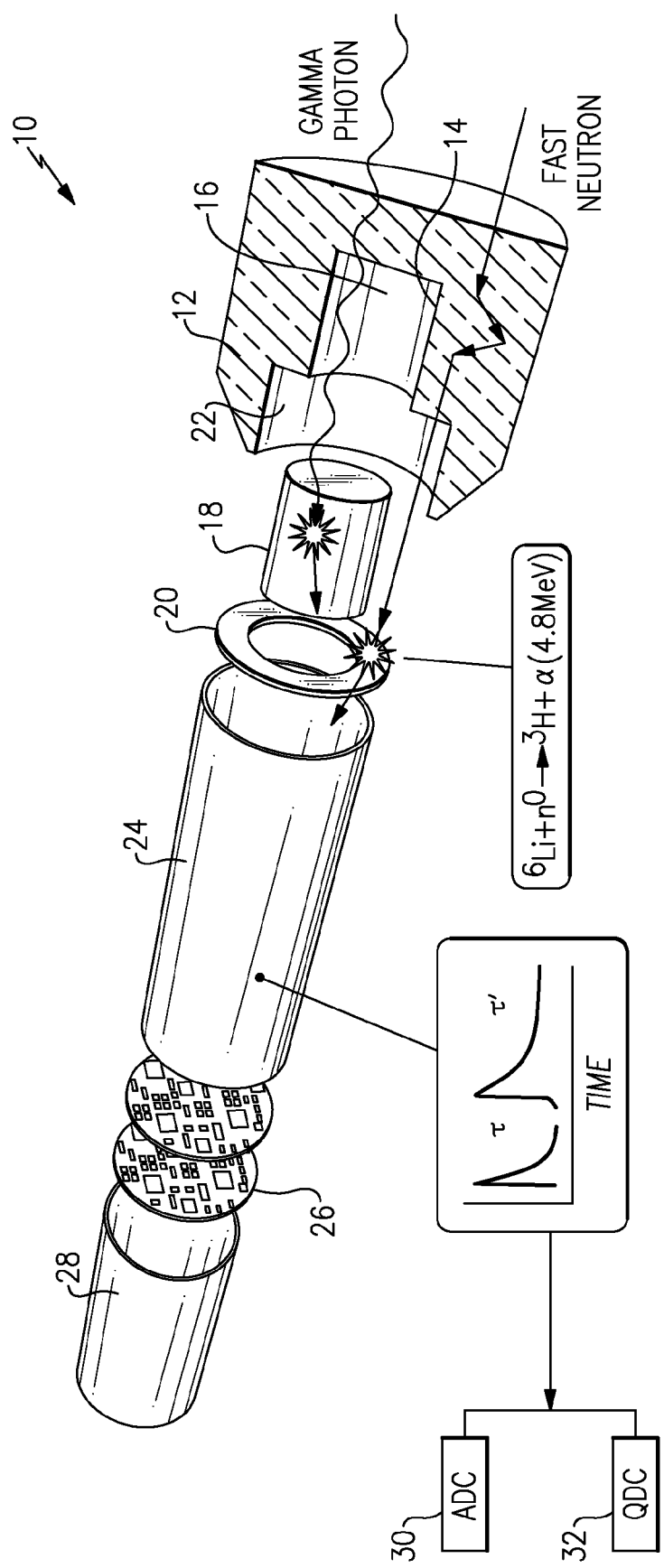
FIG. 1 is an exploded view of a Hand-Held RadioIsotope Identification Device (HHRIID) with adaptive gamma threshold according to an embodiment of the invention.

Referring now to FIG. 1, an integrated neutron-gamma radiation detector is shown generally at 10. At one end, the detector 10 includes a neutron moderator 12 that includes a material that slows down fast neutrons entering the moderator 12, but allowing thermal neutrons and gamma rays to easily pass therethrough. For example, the neutron moderator 12 may include hydrogen, and the like. The moderator 12 includes a cavity 14 that is lined with an optical reflector 16. A gamma sensing element 18 is disposed within the cavity 14 of the neutron moderator 12 and surrounded by the optical reflector 16 to increase the optical efficiency of the detector 10. In one embodiment, the gamma sensing element 18 comprises a scintillator crystal that emits a photon having a decay time, $\tau$, when a gamma ray collides with the gamma sensing element 18. Typical materials for the scintillator crystal include, without limitation, crystalline materials with high energy resolution (3% or better at 662 keV) from the Lanthanum halides class ($LaBr_3$, $LaCl_3$, $LaI_3$), as well as solid solutions of these materials. Other dense, bright and fast scintillator materials are useful for incorporation into the gamma sensor 18 as well. For example, the scintillator crystal may be made of a mixed lanthanum halide $LaX_3$:Ce (X=Br, I) gamma scintillator material that emits a photon having a decay time, $\tau_1$, of about 20 nanoseconds. The mixed lanthanum halides $LaX_3$:Ce (X=Br, I) gamma scintillator material has outstanding energy resolution that will consequently enable high-performance room temperature detectors at considerably lower cost when compared to current technologies, such as cryogenically cooled high purity Germanium (HP Ge).

The detector 10 includes a neutron element 20 that is disposed within a second cavity 22 of the neutron moderator 12. Specifically, the neutron sensing element 20 is disposed proximate the gamma sensing element 18. In the illustrated embodiment, the neutron sensing element 20 comprises a sub-millimeter thin solid annular layer that includes a mixture of particles of neutron sensing material, for example, $^6$Li in a chemical compound form, such as $^6$LiF, that is surrounded by a scintillator material in an optically transparent epoxy matrix. The neutron sensing material has a relatively large cross section (940 barns per Li $^6$atom) for thermal neutrons. Upon absorption of a thermal neutron, $^6$Li decays into $^3$H and emits an alpha particle, both charged particles with a total kinetic energy of about 4.8 MeV. The alpha particle and the triton are absorbed by the scintillator material, such as ZnS:Ag, surrounding the neutron sensing material and emits a 450 nm photon having a decay time, $\tau_2$, of about 110 nanoseconds, which is different than the decay time, $\tau_1$, of the photons emitted from the scintillator crystal of the gamma sensing element 18. In addition to use of $^6$LiF/ZnS:Ag for the neutron sensing material/scintillator material, other mixtures of $^6$Li-based powder material and scintillator particles in a matrix may be selected. In the illustrative embodiment presented in FIG. 1, the neutron sensing element 20 is shown as having a ring form; however, it is understood that the neutron sensitive composition may take the form of an article of many other shapes as well, in other configurations relative to the gamma detector. Possible shapes for the neutron sensing element are layers, sheets, rods, wires, nets, lenticular fixtures, fibers, etc. (via processes including tape-casting and extrusion); complex bodies, etc. (via processes including machining or casting); and conformal coatings, etc. (via processes including spraying, dipping, or spinning).

As described above, interaction of the alpha particle and triton with the scintillator material, such as ZnS, provides for photon emission from the scintillator material. Accordingly, although other phenomena may be included or potentially influence signals generated by the LiF/ZnS:Ag component, it should be recognized that the use of "neutron sensor" accounts for the various aspects and mechanisms that provide for or are attendant with neutron detection, and therefore the term "neutron sensor" is not to be limited by the various aspects and mechanisms.

The detector 10 includes a photosensor 24, such as a photomultiplier tube (PMT) optically coupled to the gamma sensing element 18 and the neutron sensing element 20. It will be appreciated that the invention can be practiced with any suitable photosensor, and that the use herein of the PMT as a photosensor is merely illustrative and non-limiting. To improve optical coupling, a portion of the PMT 24 is disposed within the second cavity 22 of the neutron moderator 12. The PMT 24 outputs a signal, S, indicative of the two different types of photons emitted by the gamma sensing element 18 and the neutron sensing element 20.

Although in the illustrated embodiment the integrated detector 10 includes a single photomultiplier tube 24, the detector 10 may include other photosensitive devices. For example, other embodiments of the detector 10 may include a photodiode, a PIN photodiode, an avalanche photodiode, a Geiger-mode operating photodiode, a hybrid photodetector and other similar components. In short, the PMT 24 is designed to receive and interpret a signal from each of the gamma sensing element 18 and the neutron sensor element 20 (each of the gamma sensing element 18 and the neutron sensing element 20 being a scintillator and providing and optical output in response to a radiation interaction).

The detector 10 also includes pulse shaping and process electronics package 26 that processes the signal, S, from the photomultiplier tube 24 to determine whether a given photon-emitting event is indicative of radiation interaction in the gamma sensing element 18 or in the neutron sensor element 20. In the case of gamma rays, the electronics 26 also determine the energy of the gamma ray based on the amount of charge generated in the photomultiplier tube 24 and a calibration procedure with known gamma ray energies from radioisotopic sources. A magnetic shield 28 may be provided around the photomultiplier tube 24 to prevent unwanted excitation from occurring in the photomultiplier tube 24.

As shown in FIG. 1, the pulse shape and process electronics package 26 include an analog-to-digital converter (ADC) 30 and also a charge [Q] to digital converter (QDC) 32 that receives the signal, S, from the photomultiplier 24 and provides for analysis in accordance with the teachings herein. Each signal, S, is indicative of a radiation interaction in one of the gamma sensing element 18 and the neutron sensing element 20, and has a signal amplitude $V_0$.

In general, the pulse shape discrimination in the integrated HHRIID-type neutron-gamma detector 10 requires determining two parameters for each radiation interaction: the signal (pulse) amplitude $V_0$ and the pulse charge Q. By forming the ratio of the two quantities $Q/V_0$, one can determine the scintillation decay time and associate each signal S as being one of a radiation interaction in the gamma sensing element 18 or in the neutron sensor element 20. Thus, the signal S from the photomultiplier tube 24 is split and sent to the QDC 32 and the ADC 30, for digital measurement of the signal charge Q and amplitude $V_0$, respectively.

In order to avoid optical cross-talk and provide for improved signal analysis and data, the HHRIID 10 typically includes separate optical couplings for each of the neutron sensing element 20 and the gamma sensing element 18 to the photosensor 24.

Accordingly, selection of each of the neutron sensing element 20 and the gamma sensing element 18 accounts for the various measures that may be taken to improve the detection capabilities and properties thereof. This selection may be considered as "tailoring" and "optimizing" of each of the neutron sensing element 20 and the gamma sensing element 18.

Typically, integration time for the ADC 30 comprises a period of time selected for peak detection of a sufficient quality, while integration time for the QDC 32 comprises a period of time selected for charge integration of a sufficient quality. The "sufficient quality" is typically determined by the scintillation decay times of the neutron sensing element 20 and the gamma sensing element 18 of the HHRIID 10.

Referring again to signal analysis, the amplitude and rise time of the signal S are not indicative of the source of light (neutron or gamma scintillator) since both can have a comparable dynamic range. For these applications, reference may be had to ANSI 42.34. On the other hand, signal decay time $\tau$ is a quantity specific to each scintillator ($\tau_1$ about 20 ns for the gamma sensing element 18 versus $\tau_2$ of approximately 110 ns for neutron sensing element 20).

One skilled in the art will recognize that the interaction events with scintillation decay time $\tau_1$ will be separated from the interaction events with scintillation decay time $\tau_2$, if the ratio of $\tau_2/\tau_1$ is a sufficiently large number. In particular, for the materials used in the HHRIID exemplary embodiment presented herein, if the ratio $\tau_2/\tau_1$ is approximately 5.5, then a good separation of decay times exists. However, in most cases, if the ratio $\tau_2/\tau_1$ is greater than one, adequate discrimination may be realized.

Direct measurement for the decay time of each electrical pulse requires digital sampling of the signal S with an analog-to-digital converter (ADC) 30 at frequencies of at least several hundreds of MHz. A simpler solution is to measure the decay time for each signal S by integrating the exponential signal and dividing the result to the amplitude of the signal. This can be verified mathematically by integrating an exponential decay function:

$$V_0 * \tau = \int_0^\infty V_0 e^{(-t/\tau)} dt \quad (1)$$

where t represents time (here, measured in nanoseconds), τ represents the signal decay time, and $V_0$ represents a signal amplitude. In practice, the signal amplitude $V_0$ can be measured by a non-sampling peak-sensing analog-to-digital converter (ADC) 30, while the integral of Eq. (1) is proportional to the total integrated charge Q which can be measured by a charge-to-digital converter (QDC) 32.

Each signal S from the PMT 24 is analyzed in two branches. A first branch leads to a peak-sensitive ADC 30. In some embodiments, the first branch may include a fast shaping amplifier followed by the peak-sensitive ADC 30. In the second branch, the identical signal S is used as an input to a QDC 32. Typically, QDC modules work in a gated mode with an additional "gate" electronic signal provided to the module to specify the time interval for charge integration. In one embodiment, because the QDC 32 must integrate the signal S over a period of time longer than the decay time, a "long gate" signal of approximately 500 nanoseconds is used. The peak-sensing ADC 30 uses a comparatively "short gate" interval of approximately 50 nanoseconds.

By measuring the amplitude of the pulse with the ADC 30 and the charge of the pulse with the QDC 32, the teachings herein have the advantage of being insensitive to "dark current" pulses from the photomultiplier tube 24 and provide an improved signal-noise ratio over prior art techniques. Thus, the peak amplitude of the pulses (from the ADC 30) is preserved and assures the high energy resolution of the gamma scintillator remains unperturbed for improved isotope identification.

Figure 2:
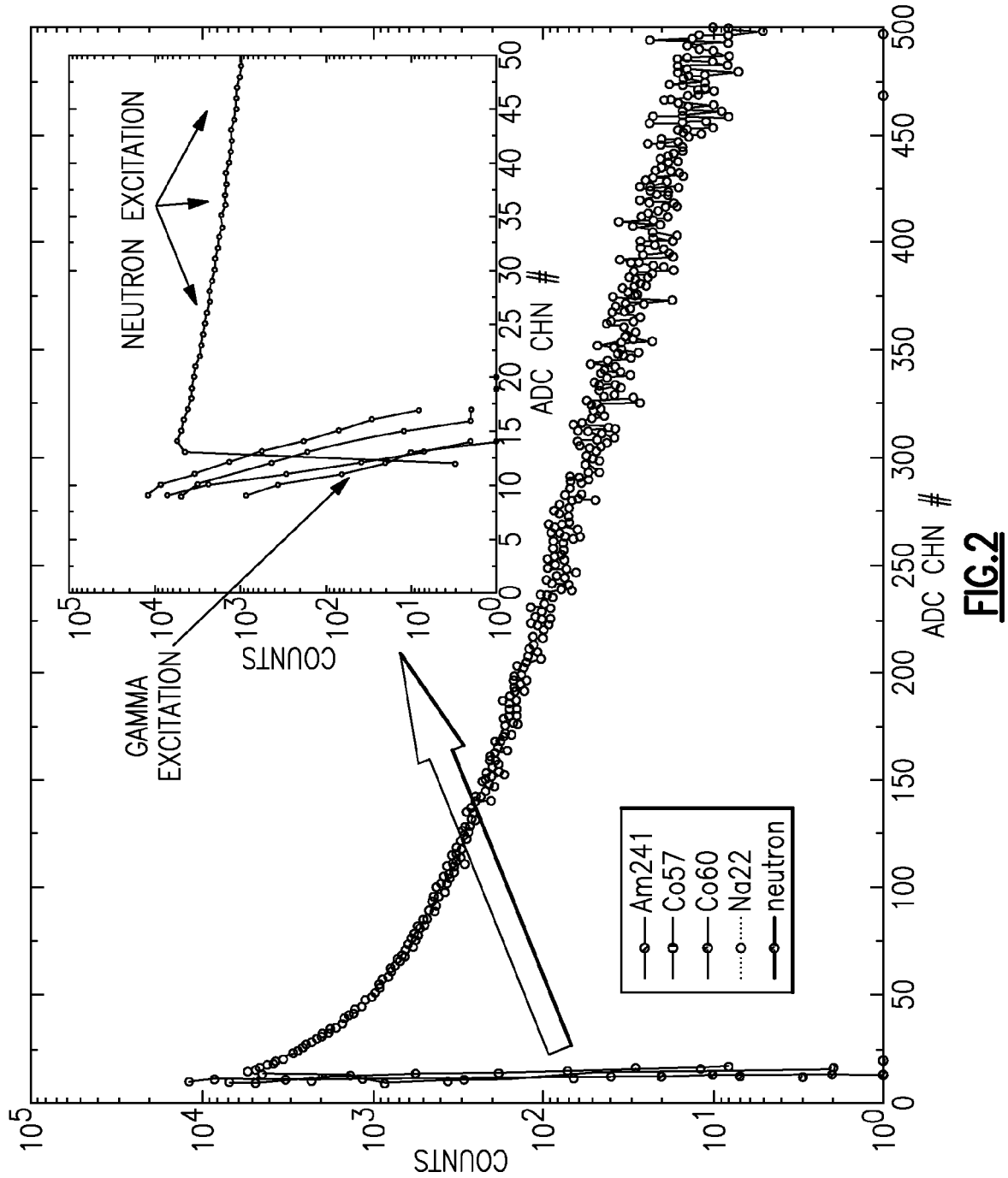
FIG. 2 is a pulse amplitude histogram for the neutron sensing material used in the neutron sensing element of the invention responding to neutrons and gamma rays of different energy.

By employing the neutron sensing element 20 that has a sub-millimeter layer thickness and is made from a material that is virtually transparent to incoming gamma radiation, the problem of gamma interaction in the neutron sensing element 20 is substantially reduced. However, it has been found that in the presence of a mixed radiation field, the neutron sensing element 20 can be excited both by neutron capture, for example, by the absorption of a neutron by the neutron sensing material, and by gamma interactions, for example, by a single Compton scattering of a gamma photon by an electron. The amount of energy deposited by a gamma interaction in the neutron sensing element 20, and thus the amount of light detected at the photomultiplier tube 24, is predominantly lower than the energy released by a neutron absorption event. For comparison, a 1 MeV gamma ray can deposit at most 0.8 MeV through a single Compton event in a typical neutron sensing element. A neutron absorption reaction by $^6Li$ always results in 4.78 MeV deposited in the neutron sensing layer 20. The energy deposited in either interaction results in the creation of primary electrons and holes in the ZnS:Ag scintillator material, followed by rapid relaxation and thermalization of the energetic secondary radiation, excitation of the luminescence centers, and eventually scintillation light is emitted. The transport of the photons from the emission site to the PMT 24 produces a detected amplitude spectrum that is dominated by the light absorption and scattering effects inside the 3-phase mixture (LiF particles+ZnS particles+epoxy). Thus, the pulse amplitude spectrum recorded by the PMT 24 presents the gamma interaction events towards the lower end of the spectrum when compared with neutron absorption events For example, FIG. 2 shows a pulse amplitude histogram of the neutron sensing layer response signal to neutrons and gamma rays of different energy. The horizontal axis is measured in ADC units, which are proportional to the signal amplitude $V_0$. In the illustrated example, the neutron sensing layer is made of $^6LiF$ neutron sensing material. However, the same type of secondary radiation effect is applicable to other materials used for the neutron sensing layer. As shown in FIG. 2, the gamma excitation of the neutron sensing layer is predominately in a very narrow signal band and having low ADC signal amplitude values.

In some embodiments of the HHRIID 10, machine-readable instructions are stored on machine-readable media within the HHRIID 10, and provide for implementation of pulse discrimination. In other embodiments, the instructions are maintained separately and implemented through a remote connection. Exemplary machine-readable media include, without limitation, hard wired circuits, read-only memory, random access memory, a hard drive, an erasable programmable read-only memory, magnetic tape, optical media, magneto-optical media and others.

Figure 3:
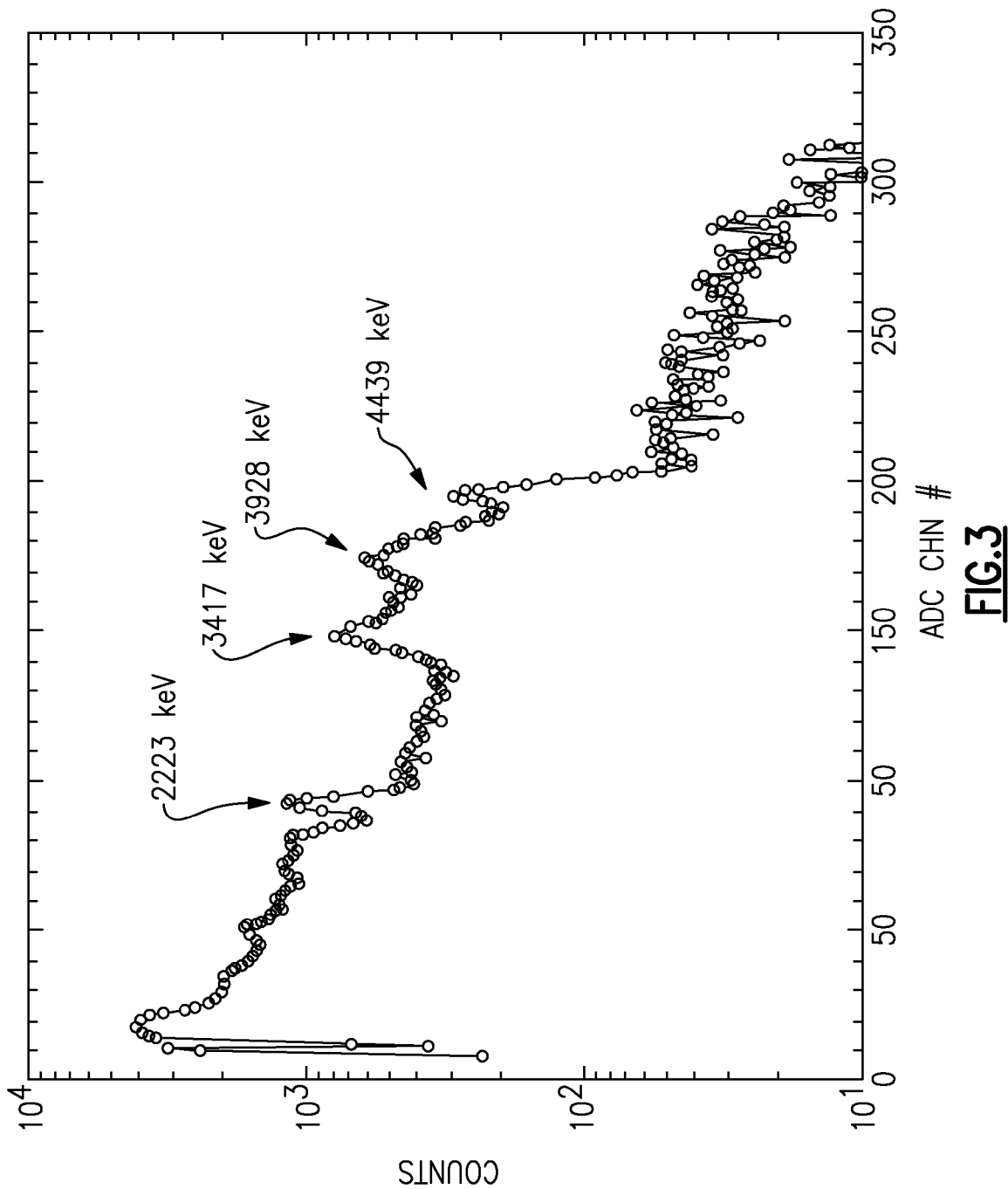
FIG. 3 is a pulse amplitude histogram for the gamma sensing material used in the gamma sensing element of the invention responding to gamma rays of different energy.

One aspect of the invention is that an electronic discrimination method has been developed to count only neutron sensor events with signal amplitudes above a threshold value set high enough that all gamma interaction events have amplitudes below the threshold value. With such a threshold setting, all the gamma interaction events would be rejected and the count rate (above the threshold) from the neutron sensing layer would be proportional to the neutron flux component. Due to optical transport effects, the neutron sensing layer response to neutrons has a spread in amplitude and thus a threshold set inadvertently too high would also reject some valid neutron events and reduce the neutron sensitivity. Therefore, the optimum threshold value must be properly matched to the maximum gamma energy that can be deposited in the neutron sensing layer. This is highly variable from one application to another. For example, a radioisotope identifier embodiment could be used to inspect a package containing the industrial isotope $Am^{241}$, which emits 60 keV gamma rays, and simultaneously be ready to detect neutrons with high sensitivity. In another application example, the same detector is exposed to an industrial Pu—Be neutron source, which emits a spectrum of energetic gamma rays as high as 4.4 MeV, as shown in FIG. 3. From these two examples, it is clear that the threshold for neutron discrimination must be adapted to the maximum gamma energy present in the radiation field in order to maintain optimal neutron sensitivity.

Figure 4:
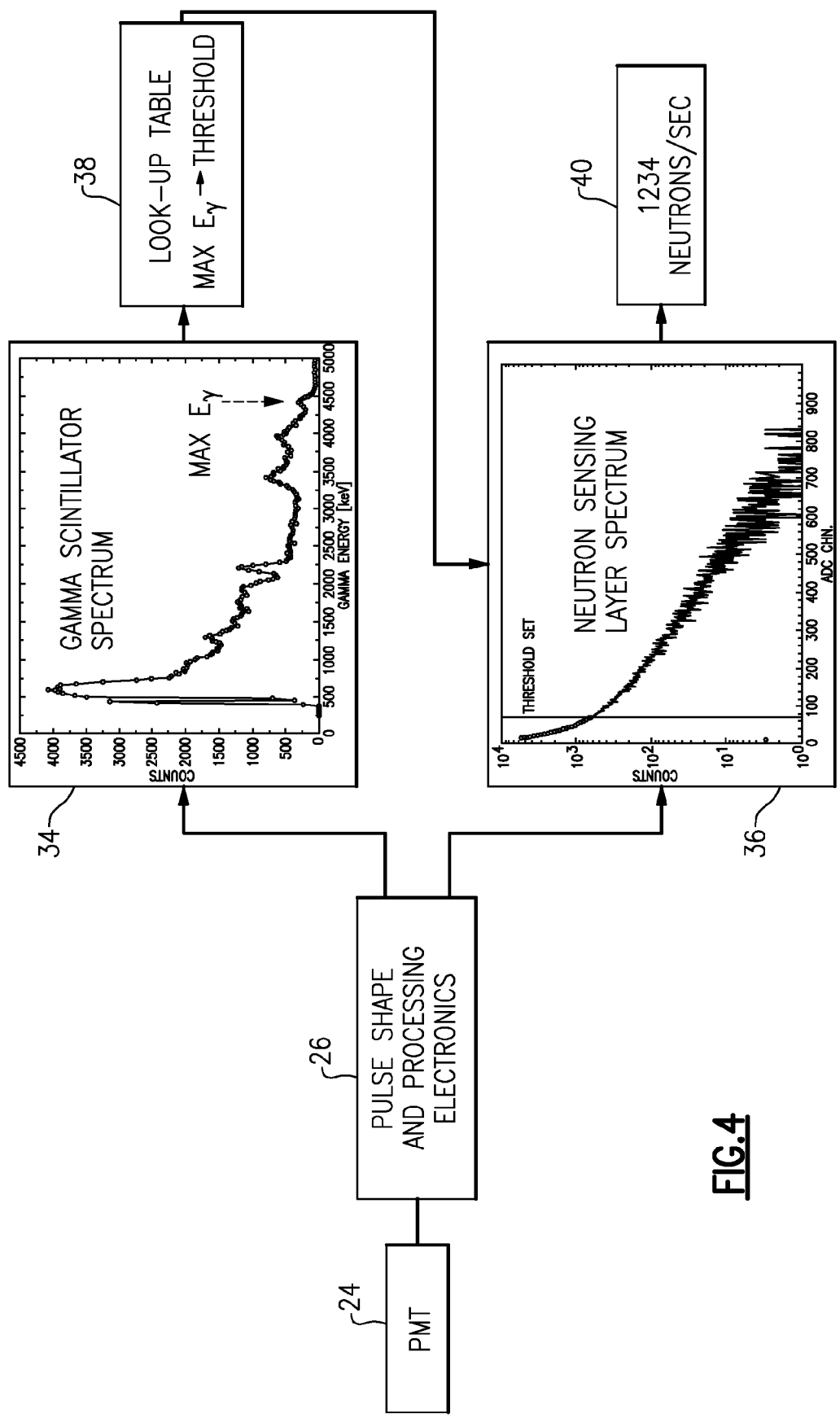
FIG. 4 is a block diagram showing the apparatus and method of adaptively selecting a gamma threshold for the neutron sensing element according to an embodiment of the invention.

Referring now to FIG. 4, the integrated detector 10 of the invention provides an adaptive setting of the neutron threshold based on feedback from the gamma sensing element 18. Once the detector 10 is exposed to an unknown mixed radiation field, the pulse shape and processing electronic 26 separates the light pulses from the common photosensor 24 into neutron sensing element pulses and gamma sensing element pulses. For example, as shown in the upper right histogram of FIG. 4, a histogram 34 by amplitude of the pulses detected by the gamma sensing element 18 is generated to provide a spectrum with peaks associated with full-energy deposition of gamma rays. It can be seen from the histogram 34 of the pulses detected by the gamma sensing element 18 that the spectrum provides information useful for peak search algorithms that determine the maximum gamma energy detected by the gamma sensing element 18. For example, the maximum gamma energy detected by the gamma sensing element 18 from a $^{238}$Pu—Be source is about 4.439 MeV.

In addition, a histogram 36 by amplitude of the pulses detected by the neutron sensing element 20 is generated to provide a spectrum of the neutron sensing element response to neutrons and gamma rays, as shown in the lower right histogram in FIG. 4. It can be seen from the histogram 36 of the pulses detected by the neutron sensing element 20 that the spectrum provides information such that an algorithm can be used to search a look-up table 38 for the response of the neutron sensing element 18 to gamma rays, and determine the corresponding threshold to be set for neutron counting. Then, the amplitude of each light pulse attributed to the neutron sensing element 20 is compared to the threshold. If the amplitude of the light pulse from the neutron sensing element 20 is above the threshold, then the pulse is counted as a valid neutron event. Thus, the integrated detection 10 of the invention determines the maximum gamma energy associated with the gamma sensing element 18 to adaptively select the gamma threshold for the neutron sensing element 20, thereby minimizing the effects of radiation crosstalk in the neutron sensing element 20 by counting light pulses having an amplitude above the selected threshold as valid neutron events, indicated as element 40.

Other exemplary embodiments of the teachings herein include use of a plurality of the HHRIID, or equivalents thereof, in permanent installations for radiation monitoring and radiation surveillance. Non-limiting examples include fixed monitoring for package or vehicle inspection. The plurality of monitoring devices provides for increased sensitivity accuracy and throughput in a production environment. Accordingly, a variety of systems may be realized wherein an RIID (an embodiment of the HHRIID that is not necessarily hand-held) are used. Typically, in such embodiments, the RIID are coupled to a central console for evaluation and summation of data from each element within the plurality. As such techniques for radiation monitoring are known, such aspects are generally not discussed further herein.

Accordingly, the teachings herein provide the technical effect of separating alpha radiation fields and neutron radiation fields from gamma radiation fields. Of course, one skilled in the art will recognize that other embodiments may be realized. For example, accounting for beta radiation fields using appropriate scintillators may be realized. Other radiation types that may be evaluated include, without limitation, alpha particles, beta particles, gamma rays, ions and neutrons. The apparatus need not be limited to "hand held" implementations, and may include other physical constructions, such as, for example, permanent installations. Accordingly, the teachings herein are not limited to the exemplary embodiments provided.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An integrated neutron-gamma radiation detector, comprising:
    a gamma sensing element;
    a neutron sensing element;
    a photosensor optically coupled to both the gamma sensing element and the neutron sensing element; and
    pulse shape and processing electronics package coupled to the photosensor for determining a maximum gamma energy associated with the gamma sensing element,
    wherein a gamma threshold for the neutron sensing element is determined from the gamma sensing element based on the maximum gamma energy present in a radiation field, and
    wherein a light pulse emitted by the neutron sensing element is counted as a valid neutron event when an amplitude of the light pulse is above the gamma threshold.

2. The detector according to claim 1, wherein the gamma sensing element comprises a sensor formed of materials comprising: a crystalline form of at least one of $LaBr_3$, $LaCl_3$, $LaI_3$; a solid solution of at least one of $LaBr_3$, $LaCl_3$, $LaI_3$; and a form of a dense, bright and fast scintillator material.

3. The detector according to claim 1, wherein the neutron sensing element comprises a sensor formed of at least one of: LiF/ZnS, LiF/ZnS:Ag and a mixture of a Lithium based powder material comprising scintillator particles.

4. The detector according to claim 1, wherein the photosensor comprises at least one of a photomultiplier tube, a photodiode and an avalanche photodiode.

5. The detector according to claim 1, wherein the pulse shape and processing electronics package comprises an analog-to-digital converter (ADC) and a charge-to-digital converter (QDC), and wherein an integration time for at least one of the QDC and the ADC is selected for controlling pulse shape discrimination to account for a scintillation decay time associated with the gamma sensing element and the neutron sensing element.

6. The detector according to claim 5, wherein an integration time for the ADC is about 50 nanoseconds.

7. The detector according to claim 5, wherein an integration time for the QDC is about 500 nanoseconds.

8. A method for adaptively selecting a gamma threshold in an integrated neutron-gamma radiation detector, the detector comprising a gamma sensing element, a neutron sensing element, a photosensor optically coupled to the gamma sensing element and the neutron sensing element, and a pulse shape and processing electronics package coupled to the photosensor, the method comprising the steps of:
    determining a maximum gamma energy associated with gamma rays detected by the gamma sensing element;
    selecting a gamma threshold for the neutron sensing element based on the maximum gamma energy as determined by the gamma sensing element,
    whereby a light pulse emitted by the neutron sensing element is counted as a valid neutron event when an amplitude of the light pulse is above the gamma threshold.

9. The method according to claim 8, wherein the gamma sensing element comprises a sensor formed of materials comprising: a crystalline form of at least one of $LaBr_3$, $LaCl_3$, $LaI_3$; a solid solution of at least one of $LaBr_3$, $LaCl_3$, $LaI_3$; and a form of a dense, bright and fast scintillator material.

10. The method according to claim 8, wherein the neutron sensing element comprises a sensor formed of at least one of: LiF/ZnS, LiF/ZnS:Ag and a mixture of a Lithium based powder material comprising scintillator particles.

11. The method according to claim 8, wherein the photosensor comprises at least one of a photomultiplier tube, a photodiode and an avalanche photodiode.

12. The method according to claim 8, further comprising the steps of:
   determining a signal amplitude $V_0$ for each detected interaction;
   determining a signal charge Q for each detected interaction; and
   classifying each radiation interaction according to radiation type by evaluating the signal amplitude $V_0$ and the signal charge Q.

13. The method according to claim 12, wherein evaluating the signal amplitude $V_0$ and the signal charge Q comprises forming a ratio ($Q/V_0$).

14. The method according to claim 13, wherein the ratio provides for determining a scintillation decay time for the gamma sensing element and the neutron sensing element.

15. The method according to claim 14, wherein a scintillation decay time for the neutron sensing element is separated from the scintillation decay time for the gamma sensing element by a factor greater than one.

16. The method according to claim 8, wherein the pulse shape and processing electronics package comprises an analog-to-digital converter (ADC) and a charge-to-digital converter (QDC), and wherein an integration time for at least one of the QDC and the ADC is selected for controlling pulse shape discrimination to account for a scintillation decay time associated with the gamma sensing element and the neutron sensing element.

17. The method as in claim 16, wherein an integration time for the ADC is about 50 nanoseconds.

18. The method as in claim 16, wherein an integration time for the QDC is about 500 nanoseconds.

* * * * *